2,909,961

METHOD OF EXAMINING AND CLASSIFYING DIAMONDS

Albert S. Samuels, Sr., San Francisco, Calif.

No Drawing. Application August 23, 1957
Serial No. 680,025

2 Claims. (Cl. 88—14)

The present invention relates to a method of examining and classifying diamonds which also produces a record by means of which a diamond may be positively identified.

In determining the value of a diamond, it is examined for flaws which are usually carbon particles or fissures causing opacities and translucencies in the otherwise clearly transparent substance of the gem. Since the brilliance of a cut stone depends upon its transparency or ability to transmit light which is reflected and refracted by its several facets, the size, nature and positions of its flaws become important factors in classifying it and setting a value upon it.

The classifying of diamonds is done by experts usually with the aid of a microscope, and the detection of flaws requires considerable knowledge and experience. Consequently, it is difficult if not impossible for the average purchaser of a gem to judge its value, and many diamonds are sold for higher prices than they are actually worth by comparison with other stones of equal size and general appearance.

While reference is made herein to diamonds as an example, it will be understood as the description proceeds that the method of the present invention is applicable to other stones which are transparent in their nature.

In the method of the present invention a photographic film is exposed to light that has passed through a diamond and a microscope lens to produce an exposure through the diamond which produces a record of the flaws, which are, as previously stated, opacities and translucencies creating dark marks or shadow-like images on a positive film. This film, inserted in a conventional slide mount, may be projected on a screen to greatly enlarge the image upon which flaws are easily detected and measured in a manner that enables comparison of the entire flaw area with the total area of the stone.

Thus, the purchaser of a diamond may be fully informed with mathematical accuracy as to the percentage of flaws to the size of the stone.

The film or slide may also be preserved as a record by which the stone may be identified and appraised for insurance purposes as well as in cases of loss or theft, since no two stones will be identical. The method also makes a definite more scientific appraisal possible, since the eyesight, ability and personal judgment of the appraiser are largely eliminated in the detection and estimation of the magnitude of flaws.

It is the object of this invention to provide a method for examining and classifying diamonds or other transparent precious stones which enables an accurate detection of the percentage of flaw area to the entire area of the stone and which produces a record by which this percentage may be determined, and which constitutes a means for identifying the stone.

In practising the invention, the stone to be examined is placed over a light source, such as an electric lamp, and surrounded by a light shield to exclude the upward passage of light except through the stone itself. The light shield may be of any opaque material with the perforations small enough to support the diamond by contact with its largest perimeter or girth and as large as possible so as to permit light to pass through substantially the entire stone. An adjustable orifice may be employed, and for the most common shape of stone which is substantially round at its perimeter or girth, I have found that an adjustable camera iris makes a satisfactory support and light shield. The stone is supported in an upright position, that is with its table, or large flat area, facing upwardly. A microscope and camera are arranged above with the focal distance adjusted to the plane of the stone. Upon exposure of the camera film to the light beneath the stone, the shape of the diamond is produced on the film with all flaws represented as dark areas. The image produced will be in the order of one or two inches in diameter more or less, depending upon the size of the stone, and may be projected on a screen for greater enlargement. The screen employed is circular to correspond to the general shape of the diamond and is of a known size with a reticulated surface formed by lines dividing it into squares of a known number. For example, a convenient screen size is a circle of 1000 square inch area with a system of crossed lines dividing it into one inch squares which will total one thousand.

By adjusting the distance between the projector and the screen, the image on the film is brought to the exact size of the circular screen, and images of the flaws will overlie the one inch reticles. Now by counting the number of reticles included in the flaw images, the percentage of flaw exposed when looking vertically through the diamond, or parallel to its axis, is known. For example when twenty squares are included in the flaw area, the stone may be said to be ninety-eight percent clear. This figure when used in comparison with the reading of other stones examined by the same method creates a standard by which diamonds may be accurately judged and classified. Thus the purchaser is protected against false or inaccurate claims as to the flaws in a stone and a record is produced by which the stone can be identified as well as classified.

For stones of square cut or other shape, a screen of corresponding shape may be employed or the image produced by the method of this invention may be projected on a large reticulated screen and the number of reticles covered by flaw images may be compared to the total number of reticles covered by the odd-shaped image to obtain a percentage in the manner described above.

I claim:

1. The method of examining and classifying a transparent stone by detecting the entire amount of flaw therein and determining the ratio of the entire amount of flaw to the total size of the stone, said method including producing an image of the entire stone having the area of flaw therein, projecting the image onto a reticulated screen having a plurality of reticles each of equal size, adjusting the size of the projected image of the entire stone so that the projected image covers only a known given number of the reticles, whereby the classification of the stone may be determined by the ratio of reticles covered by the flaw area to the total number of the known given reticles on the screen.

2. The method of examining a diamond by detecting the entire flaw area therein and then classifying such diamond by determining the ratio of the entire flaw area to the total area of the diamond, said method including passing light through the entire diamond, producing a photographic image of only the light passing through the entire diamond to show an image of the shape of the diamond and an image of the flaw area, projecting the image onto a reticulated screen corresponding in shape to the general shape of the diamond and having a known number of reticles each of equal size, adjusting the size of the projected image of the entire diamond on the screen so that the projected image covers the known number of said reticles, whereby the classification of the diamond may be readily determined by the ratio of the number of reticles included in the flaw area image to the total number of known reticles on the screen.

References Cited in the file of this patent

UNITED STATES PATENTS

| | | |
|---|---|---|
| 1,700,496 | Heitzler | Jan. 29, 1929 |
| 1,799,604 | Read | Apr. 7, 1931 |
| 2,742,813 | Zeininger | Apr. 24, 1956 |